United States Patent

Maruyama et al.

Patent Number: 5,917,269
Date of Patent: Jun. 29, 1999

[54] VIBRATION WAVE DRIVING DEVICE

[75] Inventors: Yutaka Maruyama, Tokyo; Koji Kitani, Chofu, both of Japan

[73] Assignee: Canon Kabushiki Kaisha, Tokyo, Japan

[21] Appl. No.: 08/898,494

[22] Filed: Jul. 22, 1997

[30] Foreign Application Priority Data

Jul. 23, 1996 [JP] Japan .................................. 8-193649

[51] Int. Cl.$^6$ ...................................................... H02N 2/00
[52] U.S. Cl. ............................................................. 310/323
[58] Field of Search ............................................. 310/323

[56] References Cited

U.S. PATENT DOCUMENTS

| | | | |
|---|---|---|---|
| 4,382,820 | 5/1983 | Inoue | 106/90 |
| 4,978,882 | 12/1990 | Kitani | 310/328 |
| 4,995,199 | 2/1991 | Miyoshi et al. | 51/326 |
| 5,041,750 | 8/1991 | Kitani | 310/323 |
| 5,150,000 | 9/1992 | Imasaka et al. | 310/323 |
| 5,157,300 | 10/1992 | Kataoka et al. | 310/323 |
| 5,440,191 | 8/1995 | Takagi | 310/323 |
| 5,448,129 | 9/1995 | Sumihara et al. | 310/323 |
| 5,468,130 | 11/1995 | Yamada et al. | 418/55.2 |
| 5,492,091 | 2/1996 | Russ | 123/188.3 |
| 5,594,291 | 1/1997 | Tamai et al. | 310/323 |
| 5,647,967 | 7/1997 | Murase | 205/131 |

*Primary Examiner*—Thomas M. Dougherty
*Attorney, Agent, or Firm*—Fitzpatrick, Cella, Harper & Scinto

[57] ABSTRACT

A long-life vibration wave motor which abrades little and can be driven for long time periods. causes a vibration member to form a vibration wave and thereby moves the vibration member and a contact member in tight contact with the vibration member relative to each other by a frictional force. The vibration wave motor includes a sliding material made from hard particles and a soft metal softer than the hard particles and having a sliding surface obtained by projecting the hard particles by 0.2 to 2 $\mu$m from the surface of the soft metal used in one of two contact portions of the vibration member and the contact member.

31 Claims, 4 Drawing Sheets

VIBRATION WAVE DRIVING DEVICE

BACKGROUND OF THE INVENTION

1. Field of the Invention

The present invention relates to a vibration wave driving device for obtaining a driving force by causing a vibration member to produce a vibration wave.

2. Related Background Art

The outline of the principle of a vibration motor using a travelling vibration wave is as follows. A vibration member (stator) is manufactured by fixing two groups of piezoelectric elements arranged in the circumferential direction to one surface of an elastic member formed into a ring-like shape and made of an elastic material such as a metal whose total length is an integral multiple of a length $\lambda$.

These piezoelectric elements are arranged so as to alternately have opposite expansion-shrinkage polarities at a pitch of $\lambda/2$ in each group. Also, the piezoelectric elements are arranged so that there is a difference of an odd-number multiple of $\lambda/4$ between the two groups. Electrode films are formed on the two groups of the piezoelectric elements.

When an AC voltage is applied to only one group (to be referred to as phase A hereinafter), a standing wave (wavelength $\lambda$) of a bending vibration, in which the central point of each piezoelectric element of the phase A and points at intervals of $\lambda/2$ from the central point are antinodes and the central points between these antinodes are nodes, is produced throughout the entire circumference of the elastic member of this vibration member.

When an AC voltage is applied to the other group (to be referred to as phase B hereinafter), a standing wave is similarly produced. However, the positions of antinodes and nodes are shifted $\lambda/4$ from those in the standing wave of the phase A.

When alternating signals having the same frequency and a timewise phase difference of 90° are simultaneously applied to phases A and B, the standing waves of the two phases are synthesized. Consequently, a travelling wave (wavelength $\lambda$) of a bending vibration which vibrates in the circumferential direction is produced in the elastic member. At this time, each point in the elastic member having a thickness shows an elliptic motion.

Accordingly, when a ring-like movable member (rotor), for example, is directly brought into tight contact with one surface of the elastic member, this movable member is rotated by a frictional force in the circumferential direction from the elastic member. Also, to increase the circumferential component of the elliptic motion, a plurality of radial grooves can be formed in the circumferential direction in the surface of the vibration member away from the surface to which the piezoelectric elements are fixed. As a consequence, the neutral plane of the vibration moves to the piezoelectric element fixed surface, and this increases the rotating speed for the same amplitude of an input alternating signal. This also effectively increases the motor efficiency.

A vibration wave motor as a vibration wave driving device based on the above principle has a low-speed high-torque motor characteristic and is therefore suited to high-accuracy rotation or high-accuracy positioning. Also, a vibration wave motor performs driving with a frictional force, so a larger frictional coefficient is more desirable in terms of motor performance.

One drawback of a vibration wave motor is that the sliding material used in the tight contact portion easily abrades. Therefore, it is desirable that the sliding material have a high abrasion resistance and a high thermal conductivity and readily dissipate frictional heat having an adverse effect on the abrasion resistance, and more importantly, the sliding material be readily obtainable in practice, inexpensive, and processable at a low cost.

Accordingly, the general approach is to harden the surface of an aluminum alloy or form a plating containing ceramic particles. Additionally, a silicon (Si)-containing aluminum-based alloy having a relatively high abrasion resistance among other aluminum alloys is proposed as the sliding material of a vibration wave motor.

As a counterpart material of this sliding material, a ceramic harder than usual metals or a resin material which forms a thin film on the sliding surface of the sliding material and gives lubricating properties to the sliding material is currently proposed for use in a vibration wave motor, since each material has a relatively high abrasion resistance and changes the abrasion surface little over long time periods.

SUMMARY OF THE INVENTION

One aspect of the present invention is to provide a vibration wave driving device whose abrasion resistance is improved by using a material in which hard particles project from the surface of a soft metal as a sliding material for use in the vibration wave driving device.

Other objects and advantages of the invention will become apparent from the following detailed description taken in conjunction with the appended claims.

DETAILED DESCRIPTION OF THE PREFERRED EMBODIMENTS

Figure 1:
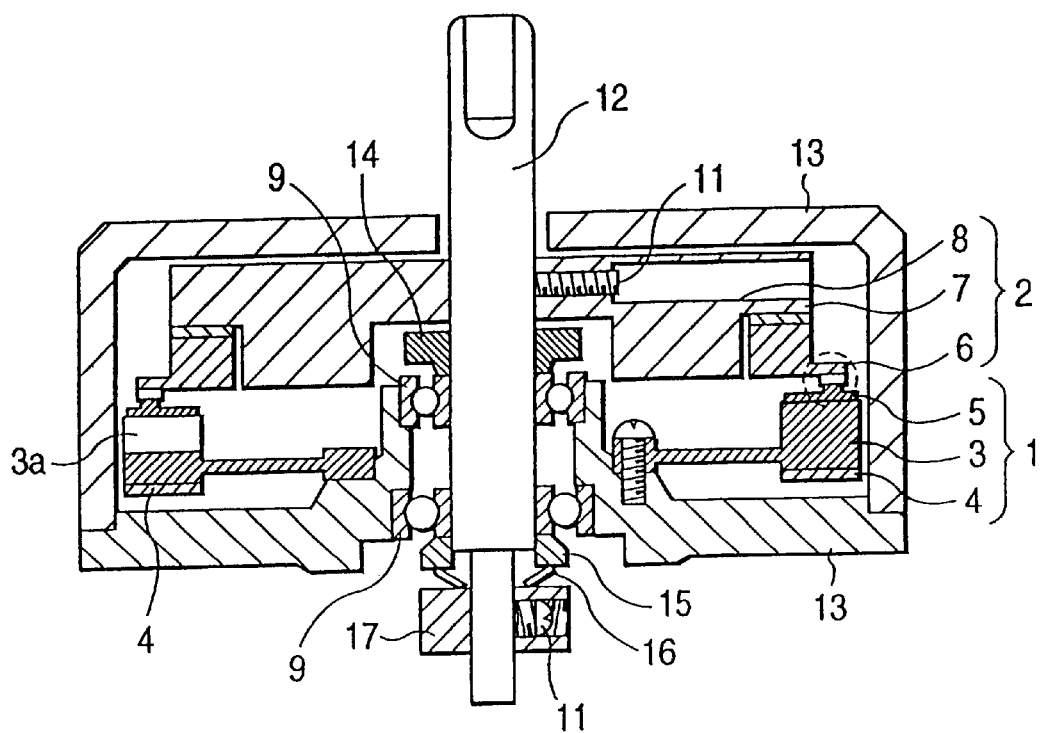
FIGS. 1 and 1A are sectional views showing one embodiment of a vibration wave motor according to the present invention and FIG. 1A is an enlarged view of a contact portion of the vibration wave motor.
Figure 1A:
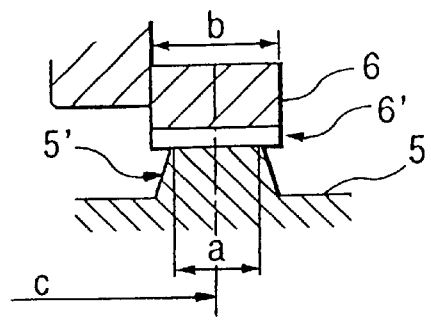

FIG. 1 is a sectional view showing one embodiment of a vibration wave motor as a vibration wave driving device according to the present invention, and FIG. 1A is an enlarged view of a contact portion of the vibration wave motor.

In a vibration member 1 shown in FIG. 1, two groups of ring-like piezoelectric elements 4, polarized in units of a plurality of elements as described previously, are concentrically adhered by a heat-resistant epoxy resin-based adhesive to one end face of a ring-like metal elastic member 3 made from a flexible metal such as stainless steel, phosphor bronze, or an aluminum alloy. A vibration member side sliding material 5 made from a resin material or an inorganic material is also similarly adhered to the other end face of the metal elastic member 3. A plurality of grooves are regularly formed in the circumferential direction in the other end face of the metal elastic member 3 so that these grooves form the shape of a comb in order to increase the motor efficiency.

A movable member 2 as a contact member is formed by attaching a ring-like movable member side sliding material 6 (having a surface treatment layer 6' in some cases) made from an aluminum alloy to a support member 8 via a rubber ring 7. The support member 8 is fixed to an output shaft 12 by a screw 11.

The sliding surfaces of the vibration member 1 and the movable member 2 are brought into tight contact with each other by a load of, e.g., 5 kgf in the axial direction by a pressing leaf spring 16. The vibration wave motor also includes a bearing 9, a cover 13, pressurizing collars 14 and 15, and a collar 17 fixed to the output shaft 12 by a screw 11. A step 5' in the radial direction of the sliding surface of the vibration member is 0.05 mm, although this step changes in accordance with the abrasion margin of each vibration wave motor. Referring to FIG. 1A, a width a and a width b of the sliding portions 5, 6 are 0.8 mm and 1.3 mm, respectively, and a diameter c of the sliding portion is 30 mm.

When alternating signals such as AC voltages having a natural frequency of the vibration member 1 are applied to the two groups of the piezoelectric elements 4 alternately polarized in the direction of thickness, the vibration member 1 resonates to produce a travel ling vibration wave in its circumferential direction. Consequently, the movable member 2 in tight contact with the vibration member 1 is rotated by the frictional force between the sliding surfaces of the vibration member 1 and the movable member 2.

The sliding material was evaluated at a rotating speed of 300 rpm and a torque of 300 gcm for continuous 100 hr.

[EXAMPLES

Example 1

An aluminum-silicon-based alloy (to be referred to as an Al-Si-based alloy hereinafter) containing abrasion-resistant Si particles was used as the sliding material 6 of the movable member 2. Examples of this Al-Si-based alloy are extruded materials (e.g., Al-Si-based alloy PA series containing 20%, 30%, and 40% of Si available from Sumitomo Light Metal Industries, Ltd.) manufactured by powder metallurgy using quench-solidified Al-Si-based alloy powders, and aluminum alloys (e.g., Al-Si-based alloy SC series containing 3%, 8%, and 12% of Si available from Sumitomo Light Metal Industries, Ltd.) which are extruded materials obtained by dissolution casting. These materials are known to generally have higher abrasion resistances than those of aluminum alloys because they contain Si.

Initially, these materials were used to form the sliding material 6 shown in FIG. 1 by mechanical processing, and the sliding surface of the sliding material 6 was evaluated after being lapped. Consequently, even when an Al-Si-based alloy containing a large amount of Si and having the highest abrasion resistance was used, flaws were in some cases formed on the sliding surface of the Al-Si-based alloy, and these flaws sometimes developed into abraded portions on the order of submicrons or more in depth and 0.3 mm or more in width on the circumference, thereby deteriorating the motor performance.

Note that as the sliding material 5 on the side of the vibration member 1, resin-based materials such as a material containing 10 to 30 wt % of carbon fibers and the balance of a polytetrafluoroethylene (to be referred to as PTFE hereinafter) resin or a PTFE resin containing 10 to 50 wt % of polyimide were used.

To check the occurrence of abrasion of an Al-Si-based alloy, the sliding surface of the Al-Si-based alloy of the sliding material 6 was observed in detail with time from the initial stages of driving of the vibration wave motor by using an optical microscope or an electron microscope. Consequently, abrasion intrinsic to any material made from hard particles and a soft metal was found.

Figure 6A:
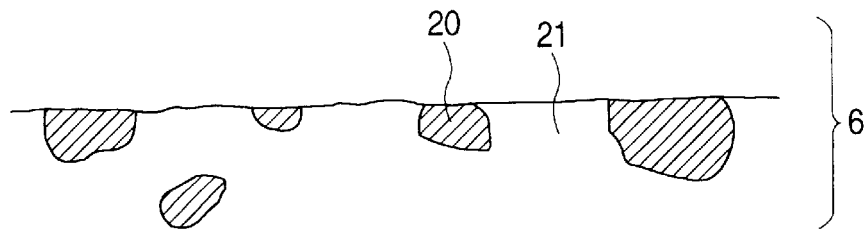
FIG. 6A is a sectional view of the sliding surface of a conventional Al-Si-based alloy at the initial stage of driving of the vibration wave motor.

That is, in a common Al-Si-based alloy, as shown in FIG. 6A, hard Si particles 20 (relatively angular particles having a particle size of 1 to about 20 $\mu$m and a Vickers hardness of about 900 to 1200) are present in a soft Al alloy 21 (containing Cu, Mg, or the like and having a Vickers hardness of about 80 to 120). Immediately after this Al-Si-based alloy starts to slide, on the mechanically processed surface of the Al-Si-based alloy, the soft Al alloy 21 is first scraped off and abraded, albeit only very slightly, from the sliding surface. The abrasion powder formed by this abrasion again attacks the Al alloy 21 directly or after being once embedded in and cohering to the resin of the counterpart material. The abrasion of the Al alloy further advances and increases the abrasion powder. This phenomenon repeats itself, and the abrasion of the Al alloy sometimes suddenly, abruptly grows and proceeds while involving even the Si particles.

Figure 6B:
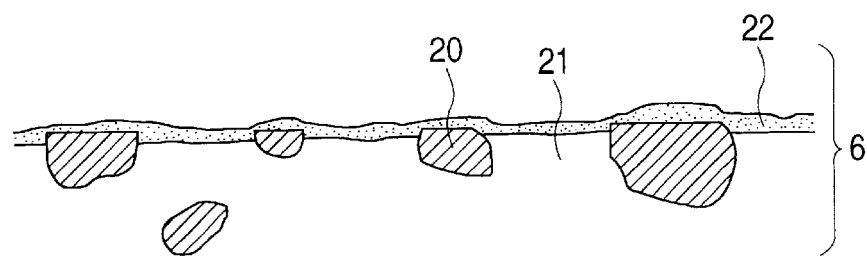
FIG. 6B is a sectional view of the sliding surface of a conventional Al-Si-based alloy after evaluated upon using a resion of a PTFE alloy as the sliding material on the side of the vibration member.

As shown in FIG. 6B, however, especially when a resin of a PTFE alloy is used as the sliding material 5 on the side of the vibration member 1, a film 22 (at most 1 to 2 $\mu$m in thickness) containing PTFE as its main constituent is formed on the sliding surface of the sliding material 6 (Al-Si-based alloy). When this film is stably formed within a short time period from the start of sliding, the film functions as a kind of a cover and makes the Al-Si-based alloy hard to abrade.

When the sliding surface of the resultant Al-Si-based alloy was observed, the surfaces of the Si particles 20 were smoothened due to sliding, and the surrounding Al alloy 21 was slightly recessed (about on the order of submicrons to 1 $\mu$m) from the smoothened surfaces of the Si particles 20.

That is, the Al alloy in this recessed portion was abraded, albeit subtly, and stabilized together with the PTFE film 22. These slight recesses of the Al alloy were similarly formed in all experimented Al-Si-based alloys, indicating abrasion inherent in Al-Si-based alloys.

The condition of the sliding surface of an Al-Si-based alloy before sliding changes in accordance with the processing method used, e.g., cutting, grinding, lapping, or polishing. FIGS. 8A to 8D show the conditions of sliding surfaces obtained by these processing methods, that were imagined from electron microscopic observation.

Figure 8A:
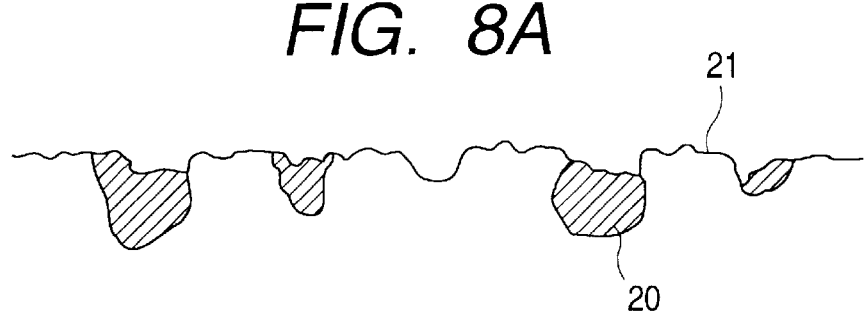
FIG. 8A is a sectional view of the sliding surface of a conventional Al-Si-Based alloy where the processing method used was cutting.

In cutting using a diamond tool shown in FIG. 8A, the hard Si particles 20 were chipped or partially removed by the edge of the tool, and the Al alloy 21 was also rubbed to cause plastic fluidization, resulting in unevenness.

Figure 8B:
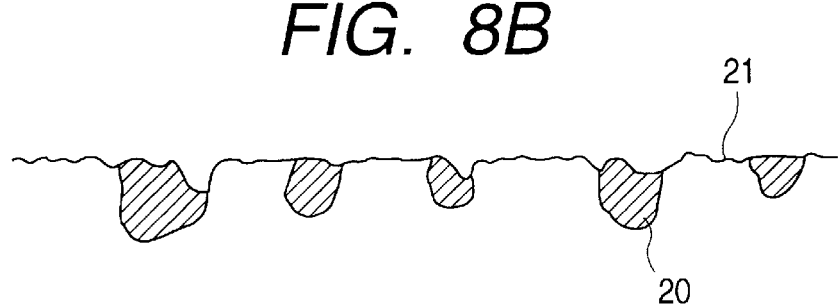
FIG. 8B is a sectional view of the sliding surface of a conventional Al-Si-Based alloy where the processing method used was grinding.

In grinding using a resin-bonded grinding wheel shown in FIG. 8B, the Si particles 20 were chipped and the Al alloy 21 was plastically fluidized to result in unevenness, like in cutting, although this unevenness was not so significant as in cutting.

Figure 8C:
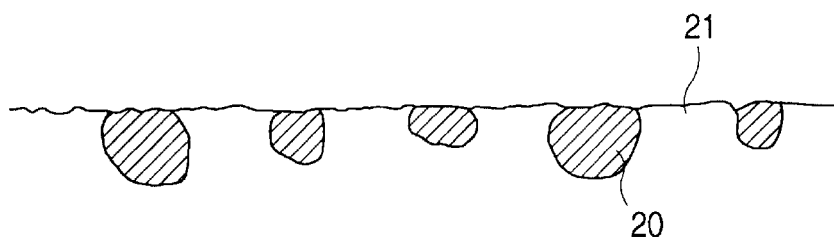
FIG. 8C is a sectional view of the sliding surface of a conventional Al-Si-Based alloy where the processing method used lapping.

In lapping using diamond particles shown in FIG. 8C, neither chipping nor removal of the Si particles 20 was found. However, plastic fluidization of the Al alloy 21 occurred to a considerable degree. This fluidization of the Al alloy 21 made the Si particles 20 difficult to clearly distinguish, resulting in a surface with a large number of flaws in the Si particles 20 and the Al alloy 21 compared to polishing.

Figure 8D:
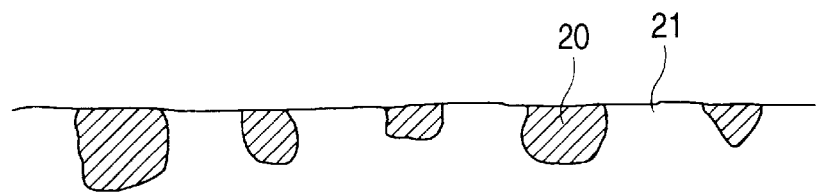
FIG. 8D is a sectional view of the sliding surface of a conventional Al-Si-Based alloy with the processing method used polishing.

In polishing shown in FIG. 8D, when silicon oxide particles of 1 µm or less and a buff cloth were used, a smooth mirror surface (having a flatness of 0.05 to 0.1 µm) with almost no flaws found in either the Si particles 20 or the Al alloy 21 was obtained.

Figure 2:
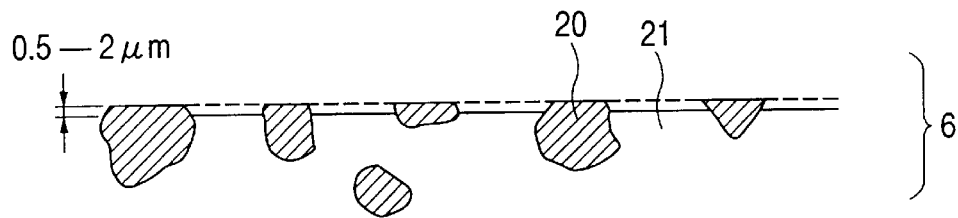
FIG. 2 is a sectional view of a sliding material made from an Al-Si-based alloy in Example 1.

When the conditions of the surfaces obtained by these processing methods and the conditions of the sliding surfaces after sliding described above were taken into consideration, it was speculated that no sudden abrasion of an Al-Si-based alloy could take place if the surface of the Al-Si-based alloy was smoothened by polishing and the Al alloy 21 was removed slightly compared to the Si particles 20 as shown in FIG. 2.

Since, therefore, Al is an amphoteric metal and easily corroded by acids and alkalis, the present inventors corroded (etched) an Al alloy substrate by using, e.g., an aqueous hydrogen fluoride solution and an aqueous sodium hydroxide solution. Consequently, it was possible to recess an Al alloy substrate from the smoothened surfaces of Si particles by corrosion of around 0.5 µm in an aqueous hydrogen fluoride solution (concentration 5%) at 20° C. for 60 sec and in an aqueous sodium hydroxide solution (concentration 10%) at 20° C. for 60 sec (note that the material was well washed with water after being corroded).

It was also possible to control the recess amount of the Al alloy substrate at an accuracy of ±0.1 µm by changing the corrosion time or temperature.

An Al-Si-based alloy having an Al alloy recessed portion (projections of Si particles) shown in FIG. 2 thus manufactured was evaluated by using the alloy as the sliding material 6 on the movable member side of the vibration wave motor. As a consequence, it was possible to nearly prevent the occurrence of abrupt abrasion which sometimes took place in the Al-Si-based alloy described above.

The Si content also is related to the abrasion resistance; the larger the Si content, the higher the abrasion resistance. Of evaluated Al-Si-based alloys containing 3 to 40 wt % of obtainable materials, the abrasion resistances of all Al-Si-based alloys except the one containing 3 wt % of a material was improved by projecting Si particles on the sliding surface by only about 0.2 to 2.0 µm from an Al alloy substrate.

When the projection amount of the Si particles was further increased (i.e., when the removal amount of the Al alloy substrate by etching was increased), the Si particles readily fell out and abraded the Al alloy and the Si particles. This worsened, rather than improved, the outcome.

The combination of the sliding material 5 of the vibration member 1 as a counterpart material 6 and the sliding material is chosen in accordance with the relation to the life of the vibration wave motor. A material containing PTFE by which the above-mentioned film to be formed on the sliding surface is readily formable and also containing fibers as a reinforcing material is desirable. As this fiber, a carbon fiber is particularly desirable because carbon abrades and functions as a lubricant to alleviate the adverse effect on the sliding surface. Although the attack on the sliding material 6 of the counterpart movable member 2 by the carbon material was increased (the aluminum alloy was easily scraped off), the abrasion resistive amount of the sliding material 5, i.e., the abrasion amount per unit time was very small.

Example 2

It is known that the abrasion resistance of a normal aluminum alloy (Al-Cu-based, Al-Mn-based, Al-Mg-based, Al-Mg-Si-based, or Al-Zn-Mg-based alloy) is inferior to that of an Al-Si-based alloy, and this abrasion resistance can be improved by plating the surface of the alloy by electroless plating using nickel-phosphorus (Ni-P, a Vickers hardness is 300 to 400) containing a silicon carbide (SiC) powder (the particles are substantially spherical, the average particle size is 1 to 3 µm, and the Vickers hardness is 1500 or more).

Figure 7A:
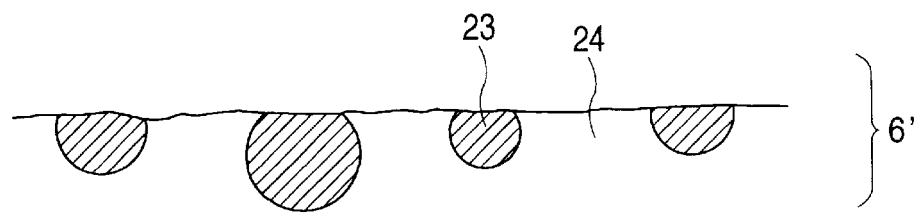
FIG. 7A is a sectional view of the sliding surface of a conventional SiC-containing Ni-P plating at the initial stage of driving of the vibration wave motor.
Figure 7B:
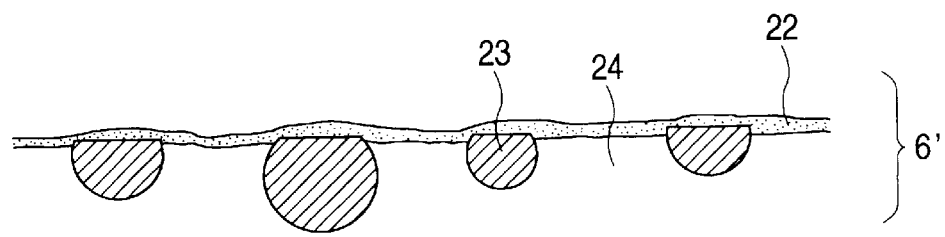
FIG. 7B is a sectional view of the sliding surface of a conventional SiC-containing Ni-P plating after evaluation.

When the resultant sliding surface (a surface treatment layer 6' of a sliding material 6) was observed in detail, however, as shown in FIGS. 7A and 7B, hard SiC particles 23 slightly projected from the start to the end of sliding and a nickel alloy 24 was recessed.

Also, the abrasion powder of the nickel alloy cohered on the sliding surface to not only adversely affect the rotation or the torque stability of the vibration wave motor but also degrade the abrasion resistance of the nickel alloy itself.

Figure 3:
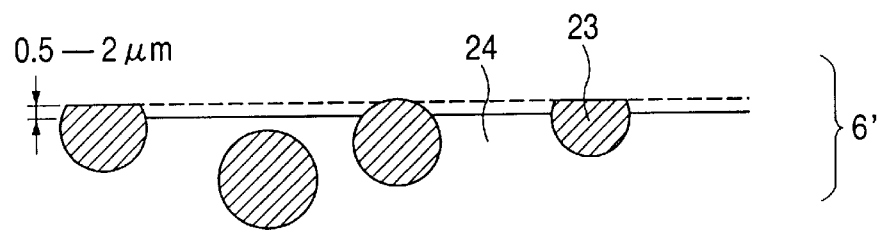
FIG. 3 is a sectional view of a sliding layer made from an SiC-containing Ni-P plating in Example 2.

As shown in FIG. 3, therefore, the surface of the Ni-P plating 24 containing the SiC particles 23 on the surface of the surface treatment layer 6' of a sliding material already smoothened by cutting, grinding, or polishing was coated with aqua regia containing 3:1 of hydrochloric acid and nitric acid by using absorbent wadding, left to stand for 1 to 2 min, and washed with water to remove the aqua regia. Consequently, it was possible to corrode and remove about 0.5 to 2.0 µm of only an Ni-P alloy in the plating.

The surface treatment layer 6' of the sliding material thus manufactured (the sliding material on the movable member side) and a resin composite material (the sliding material on the vibration member side) made from 20 wt % of carbon fibers and 80 wt % of a PTFE resin were assembled in a vibration wave motor shown in FIG. 1 and evaluated. As a consequence, the abrasion resistance of the sliding material made from the Ni-P plating containing the SiC particles and the stability of the motor performance were improved.

Note that although the content of the SiC particles changes in accordance with the content in a plating solution and the treatment conditions, a maximum of about 30% was possible. In this Example, samples of 5 to 30 wt % were examined. When the content was too large, the force with which the Ni-P plating held the SiC particles weakened. Consequently, the SiC particles readily fell out and worsened, rather than improved, the abrasion resistance. The effect of the abrasion resistance was inferior when the content was too small. However, a certain effect could be obtained when the content was about 5%.

Note that the formation of the PTFE film on the Ni-P alloy surface is more unstable and less than that on the Al-Si-based alloy surface. Note also that the SiC particles are substantially spherical and easily fall. However, plating can be easily performed on the surface of a common aluminum alloy. This results in the advantage that the manufacturing cost is lower than in Example 1 provided as long as a plating apparatus is available.

Example 3

A sliding material having the sliding surface of an Al-Si-based alloy presented in Example 1 in which Si particles were projected and an Al alloy was recessed was used, and the pressure in the axial direction of a vibration wave motor shown in FIG. 1 was further increased to 8 kgf to obtain a higher torque of the vibration wave motor, i.e., make the sliding conditions stricter. As a consequence, the Al alloy abraded easily.

Figure 4:
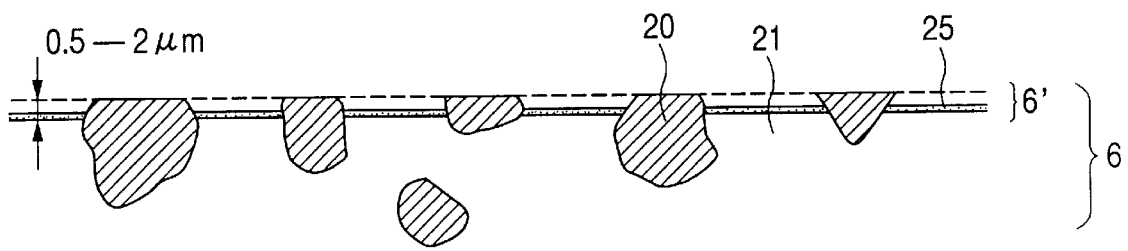
FIG. 4 is a sectional view of a sliding material made from an Al-Si-based alloy in Example 3.

To increase the abrasion resistance, therefore, as shown in FIG. 4, on the surface of an Al alloy 21 recessed by etching, an aluminum oxide layer 25 was formed by an anodizing process or a forming process so that the layer 25 did not project from the surfaces of Si particles (i.e., no aluminum oxide was formed on the Si particles).

The hardness of such a thin aluminum oxide layer is difficult to measure. However, a scratch test using a needle revealed that the Al alloy on which the aluminum oxide layer was formed was more difficult to scratch.

A surface treatment layer 6' of a sliding material 6 as described above was evaluated by applying a pressure of 8 kgf in the axial direction of a vibration wave motor shown in FIG. 1. Consequently, the aluminum alloy of this sliding material was more difficult to scratch than that of a sliding material 6 having no anodized aluminum layer, i.e., this sliding material had a higher abrasion resistance.

Example 4

Figure 5:
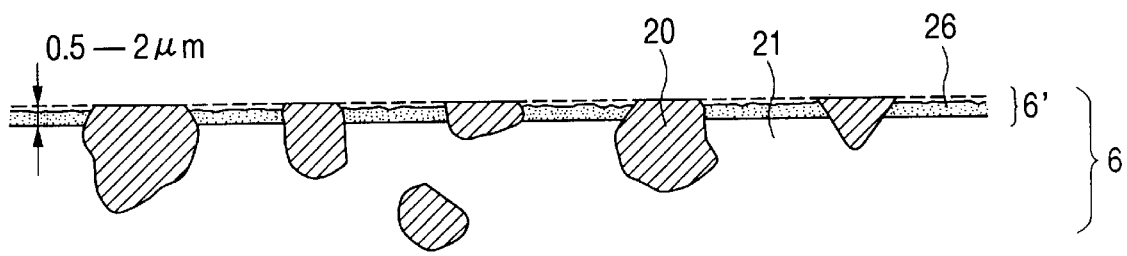
FIG. 5 is a sectional view of a sliding material made from an Al-Si-based alloy in the Example 4.

A vibration wave motor similar to that in Example 3 was used, and an Al-Si-based alloy in which an electroless Ni-P plating 26 was formed on an Al alloy 21 recessed by etching as shown in FIG. 5 was used as a surface treatment layer 6' of a sliding material 6 and evaluated.

As in Example 3, the plating layer can be formed only on the conductive Al alloy from the principle of plating.

In this Example, as in Example 3, the thickness of the plating layer was so set that the layer did not project from Si particles. This plating layer was harder than the Al alloy and improved the abrasion resistance. Note that an electroless Ni-P plating can be hardened by a heat treatment (200 to 400° C.) to have a maximum Vickers hardness of 500 to 600, and as a consequence the abrasion resistance can be further improved.

Example 5

Aluminum oxide was used as a sliding material 5 on the side of a vibration member 1 with respect to a sliding material 6 on the side of a movable member 2 in each of Examples 1 and 2, and a vibration wave motor shown in FIG. 1 was evaluated.

That is, Al-Si-based alloys in which Si particles and SiC particles as hard particles were projected and an Ni-P alloy containing SiC particles in Examples 1 and 2 were evaluated as the sliding material 6 on the side of the movable member 2. Consequently, the abrasion of the soft material was reduced to alleviate the adverse effect of an abrasion powder. This improved the abrasion resistance because sliding was done between the aluminum oxide and the hard particles of Si or SiC.

Note that a sintered ceramic and a spray-coated ceramic were used as the aluminum oxide. Both of these ceramics had a Vickers hardness of about 1440 to 1500. When the aluminum oxide was used, no PTFE film was formed unlike when the resin composite material was used as the sliding material on the vibration member side in Examples 1 and 2. Therefore, when abrasion with the hard particles Si or SiC started to occur in a vibration wave motor, this abrasion abruptly proceeded to make the vibration wave motor unusable as a motor. However, the effect of the surface from which the hard particles were projected was large enough to reduce the abrasion.

Note that in addition to the aluminum oxide, hard ceramics comparatively easily obtainable such as zirconium oxide, silicon carbide, and silicon nitride were similarly evaluated.

The results were basically as good as the aluminum oxide. However, an inexpensive oxide ceramic, particularly anodized aluminum is desirable when the cost is taken into account.

Example 6

Following the same procedures as in Example 1, a material containing alumina particles or silicon carbide particles as ceramic particles in an aluminum alloy was evaluated. A composite material of this sort containing a relatively large amount of a ceramic can be manufactured by a method by which a molten aluminum alloy is made to penetrate under no pressure into a preform in which ceramic particles are molded. Additionally, by again melting the ingot thus formed and diluting it with a molten aluminum alloy, a fluidity by which casting is possible can be obtained. This makes molding by casting possible to perform. In this method, the content of the ceramic can be 60 to 70 wt %, and the size of the particles is large and can be changed from 10 to 60 $\mu$m on the average.

The evaluated aluminum-alumina alloy contained 60 wt % of alumina particles, and the average particle size of the alumina particles was 10 $\mu$m. The evaluated aluminum-silicon carbide alloy contained 70 wt % of silicon carbide, and the average particle size was 10 $\mu$m. After the sliding surface of each material was smoothened, the particles were projected by about 2 $\mu$m by etching. The rest of the conditions and evaluation were the same as in Example 1.

The evaluation results were good; i.e., the projection of the flat hard particles and the recess of the aluminum alloy obtained by etching was extremely effective to improve the abrasion resistance. In particular, this material had a higher abrasion resistance than in the Examples described above because the size and content of the ceramic particles were large.

Additionally, since molding by casting is possible, the processing cost is not as high as that for a material containing only a ceramic. However, the processing is difficult because the content is large, so the processing cost and the material cost are higher than those of an aluminum-silicon-based alloy.

The sliding material 6 in the above Examples can be used as the sliding material 5 of the vibration member 1.

Also, the vibration member 1 need not be always fixed. That is, it is possible to fix the contact member 2 and make the vibration member 1 movable.

Furthermore, the relative movement between the contact member 2 and the vibration member 1 is not limited to rotation but can naturally be rectilinear movement.

As has been described above, in each Example a metal material in which hard particles project from a soft metal is used as a sliding material of a vibration wave motor. The result is basically a sliding condition between the hard particles and a counterpart material. This eliminates the formation of an abrasion powder of the soft metal having an adverse effect and reduces the abrasion of the sliding material. Consequently, not only the life of the vibration wave motor is prolonged but rotational and torque fluctuations of the vibration wave motor are eliminated. This results in a stabler motor performance.

More specifically, this sliding material is an aluminum-silicon-based alloy containing 3 to 40 wt % of silicon or an electroless nickel plating containing 5 to 30 wt % of silicon carbide. Although the projection amount of the hard substance (silicon or silicon carbide) is only 0.2 to 2 μm, the abrasion resistance is significantly improved.

Furthermore, when an oxide film or a plating layer having a thickness smaller than the projection of the hard substance is formed on the surface of a recessed aluminum alloy of the aluminum-silicon-based alloy, the surface of the soft aluminum alloy can be hardened and the abrasion resistance can be further improved.

The counterpart material of these sliding materials is a resin material which desirably contains a fluorine resin or carbon fibers. Other preferable examples are hard ceramics such as aluminum oxide, zirconium oxide, silicon carbide, and silicon nitride.

What is claimed is:

1. A vibration wave driving device for causing a vibration member to produce a vibration wave and moving a contact member in contact with said vibration member and said vibration member relative to each other by said vibration wave, comprising:
   a sliding material made from hard particles and a soft metal softer than said hard particles in a contact portion of one of said vibration member and said contact member, said hard particles being projected by removal processing of removing said soft metal from a surface of said sliding material.

2. A device according to claim 1, wherein etching is performed as said removal processing.

3. A device according to claim 1, wherein said hard particles are projected by 0.2 to 2 μm from a surface of said soft metal after said removal processing.

4. A device according to claim 1, wherein said removal processing is performed after smoothening is performed for the surface of said sliding material.

5. A device according to claim 1, wherein said sliding material is an aluminum alloy containing a member selected from the group consisting of silicon particles, alumina particles, and silicon carbide particles.

6. A device according to claim 2, wherein said sliding material is an aluminum alloy containing a member selected from the group consisting of silicon particles, alumina particles, and silicon carbide particles.

7. A device according to claim 4, wherein said sliding material is an aluminum alloy containing a member selected from the group consisting of silicon particles, alumina particles, and silicon carbide particles.

8. A device according to claim 5, wherein a content of said silicon particles in said sliding material is 3 to 40 wt %.

9. A device according to claim 1, wherein said sliding material is a nickel alloy containing silicon carbide particles.

10. A device according to claim 2, wherein said sliding material is a nickel alloy containing silicon carbide particles.

11. A device according to claim 4, wherein said sliding material is a nickel alloy containing silicon carbide particles.

12. A device according to claim 9, wherein a content of said silicon carbide particles in said sliding material is 5 to 30 wt %.

13. A device according to claim 1, wherein in said sliding material, a film of another hard substance is formed on the surface of said soft metal after said removal processing.

14. A device according to claim 3, wherein in said sliding material, a film of a hard substance is formed on the surface of said soft metal after said removal processing.

15. A device according to claim 4, wherein in said sliding material, a film of a hard substance is formed on the surface of said soft metal after said removal processing.

16. A device according to claim 5, wherein in said sliding material, a film of a hard substance is formed on the surface of said soft metal after said removal processing.

17. A device according to claim 9, wherein in said sliding material, a film of a hard substance is formed on the surface of said soft metal after said removal processing.

18. A device according to claim 12, wherein in said sliding material, a film of a hard substance is formed on the surface of said soft metal after said removal processing.

19. A device according to claim 13, wherein an oxide film is used as said other hard substance.

20. A device according to claim 13, wherein a plating is used as said other hard substance.

21. A device according to claim 4, wherein polishing is used as said smoothening.

22. A device according to claim 1, wherein a resin composite material is used in a contact portion of the other one of said vibration member and said contact member.

23. A device according to claim 4, wherein a resin composite material is used as a contact portion of the other one of said vibration member and said contact member.

24. A device according to claim 5, wherein a resin composite material is used as a contact portion of the other one of said vibration member and said contact member.

25. A device according to claim 9, wherein a resin composite material is used as a contact portion of the other one of said vibration member and said contact member.

26. A device according to claim 13, wherein a resin composite material is used as a contact portion of the other one of said vibration member and said contact member.

27. A device according to claim 22, wherein a material in which fibers are mixed is used as said composite resin material.

28. A device according to claim 27, wherein carbon fibers are used as said fibers.

29. A device according to claim 22, wherein said resin composite material contains a fluorine resin.

30. A device according to claim 1, wherein a ceramic is used in a contact portion of the other one of said vibration member and said contact member.

31. A device according to claim 30, wherein at least one member selected from the group consisting of aluminum oxide, zirconium oxide, silicon carbide, and silicon nitride is used as said ceramic.

* * * * *

UNITED STATES PATENT AND TRADEMARK OFFICE
CERTIFICATE OF CORRECTION

PATENT NO. : 5,917,269
DATED : June 29, 1999
INVENTOR(S) : YUTAKA MARUYAMA, ET AL.

It is certified that error appears in the above-identified patent and that said Letters Patent is hereby corrected as shown below:

<u>At [57] ABSTRACT</u>

Line 3, "periods." should read --periods--.

<u>Column 2</u>

Line 33, "FIGS.1 and 1A are sectional views" should read --FIG. 1 is a sectional view--.

Line 35, "invention" should read --invention,--.

Line 50, "evaluated" should read --being evaluated--.

Line 51, "resion" should read --resin--.

Line 59, "Al-Si-Based" should read --Al-Si-based--.

Line 62, "Al-Si-Based" should read --Al-Si-based--.

Line 66, "Al-Si-Based" should read --Al-Si-based--.

Line 67, "used" should read --used was--.

UNITED STATES PATENT AND TRADEMARK OFFICE
CERTIFICATE OF CORRECTION

PATENT NO. : 5,917,269
DATED : June 29, 1999
INVENTOR(S) : YUTAKA MARUYAMA, ET AL.

It is certified that error appears in the above-identified patent and that said Letters Patent is hereby corrected as shown below:

Column 3

Line 2, "Al-Si-Based" should read --Al-Si-based--; and "with" should read --where--.

Line 3, "used" should read --used was--.

Line 49, "travel ling" should read --travelling--.

Line 56, " [EXAMPLES" should read --[EXAMPLES]--.

Column 7

Line 4, "fall" should read --fall out--.

Signed and Sealed this

Eighteenth Day of April, 2000

Attest:

Q. TODD DICKINSON

*Attesting Officer*  *Director of Patents and Trademarks*